(12) United States Patent  (10) Patent No.: US 8,641,886 B2
Musson  (45) Date of Patent: Feb. 4, 2014

(54) METHOD, SYSTEM AND DEVICE FOR TREATMENT OF WATER

(76) Inventor: Andrew Peter Musson, Central Hawkesbay (NZ)

( * ) Notice: Subject to any disclaimer, the term of this patent is extended or adjusted under 35 U.S.C. 154(b) by 439 days.

(21) Appl. No.: 12/867,578

(22) PCT Filed: Feb. 16, 2009

(86) PCT No.: PCT/AU2009/000168
§ 371 (c)(1),
(2), (4) Date: Dec. 13, 2010

(87) PCT Pub. No.: WO2009/100496
PCT Pub. Date: Aug. 20, 2009

(65) Prior Publication Data
US 2011/0089049 A1    Apr. 21, 2011

Related U.S. Application Data

(60) Provisional application No. 61/029,095, filed on Feb. 15, 2008, provisional application No. 61/037,868, filed on Mar. 19, 2008.

(51) Int. Cl.
*C02F 1/46* (2006.01)
(52) U.S. Cl.
USPC .......................... 205/701; 205/743; 204/277
(58) Field of Classification Search
USPC .................................. 205/701, 743; 204/277
See application file for complete search history.

(56) References Cited

U.S. PATENT DOCUMENTS

| | | | |
|---|---|---|---|
| 5,728,287 A * | 3/1998 | Hough et al. | 205/743 |
| 5,738,778 A * | 4/1998 | Doring | 205/701 |
| 6,321,837 B1 | 11/2001 | Doering et al. | |
| 6,391,184 B1 * | 5/2002 | Orolin et al. | 205/687 |
| 6,984,306 B2 * | 1/2006 | Doering et al. | 205/766 |
| 2003/0155297 A1 | 8/2003 | Kellgren | |
| 2006/0027506 A1 | 2/2006 | Musson | |
| 2007/0017877 A1 | 1/2007 | Musson | |

FOREIGN PATENT DOCUMENTS

| | | |
|---|---|---|
| JP | 2000117240 A | 4/2000 |
| NZ | 549234 A | 10/2006 |
| WO | 8701690 A1 | 3/1987 |
| WO | 02102716 A1 | 12/2002 |
| WO | 2008098298 A1 | 8/2008 |

OTHER PUBLICATIONS

Extended European Search Report for Application No. 09710227.1 dated Oct. 5, 2012.
International Search Report, PCT/AU2009/000168, dated May 1, 2009.
Perry's Chemical Engineers' Handbook, Eighth Edition, McGraw-Hill, 2008 <DOI: 10.103610071422943> "Industrial Wastewater Management", pp. 22-58 to 22-81.

* cited by examiner

Primary Examiner — Arun S Phasge (57) ABSTRACT

An electrolytic method for treatment of water to increase the dissolved oxygen content, the method including:
(a) contacting the water with at least one first electrode device;
(b) providing at least one second electrode device in non-physical, electrical contact with the water;
(c) introducing an oxidant to the water, and
(d) passing an electric current between the second electrode device and the first electrode device, so as to establish an electric field in the water of sufficient strength and duration to effect the electrolytic dissociation of the water to produce dissolved oxygen and/or hydrogen species.

15 Claims, 11 Drawing Sheets

METHOD, SYSTEM AND DEVICE FOR TREATMENT OF WATER

CROSS REFERENCE TO RELATED APPLICATIONS

The present application is a national phase entry under 35 U.S.C. §371 of International Application No. PCT/AU2009/000168, filed Feb. 16, 2009, published in English, which claims priority from U.S. Ser. No. 61/029,095 filed Feb. 15, 2008, and U.S. Ser. No. 61/037,868, filed Mar. 19, 2008, all of which are incorporated herein by reference.

FIELD OF THE INVENTION

This invention relates to a method and system for the treatment of water containing organic and/or inorganic impurities. The invention also relates to an electrode device for use in the method and system. The invention additionally relates to a gas diffusing device which may for example be used in the method and system.

BACKGROUND TO THE INVENTION

Systems for the treatment of impurity-containing water have been many and varied over the years. Environments where water treatment systems are used range from the large scale, such as water reservoirs, ponds, lakes and sewage treatment plants to the small scale such as domestic septic tank systems, water tanks, ponds and pools. In all of these applications, the aim of the treatment process is to remove or neutralise organic contaminants, such as plant or animal derived matter, sewage and pathogens, or inorganic impurities, including metal ions, phosphates and nitrates. The measurement of water quality arising from the treatment include total suspended solids (TSS), biological oxygen demand (BOD), total nitrogen (TN), total coliform, dissolved oxygen (DO) and concentration of inorganic species.

In the case of sewage treatment, the systems previously used in the treatment of sewage have ranged from simple, purely anaerobic septic tanks to complex filter systems incorporating multiple filter beds, in which both anaerobic and aerobic bacterial activity can sequentially consume nutrients, remove contaminants and leave the water in a purer form.

It is often a common feature of the simple septic tank that effluent which is released into a dispersal field system of soakage drains is exceedingly high in all undesirable qualities that are routinely taken as a measure of water quality, namely TSS, BOD, total nitrogen and total coliform.

It is also often a common feature of the more complex systems of contaminated water treatment that measurements of these parameters exceed local authority maximum allowable levels.

Systems that will regularly achieve lower counts than the maximum allowable are often expensive to install and require a rigorous and expensive maintenance regime throughout the entire life of the system.

Systems for the removal of inorganic contaminants are typically quite different to those for organics removal and usually involve thermal, membrane, or electrolytic technologies. These too are often complex and involve the expense of large quantities of energy and high maintenance costs.

Moreover, the removal of both organic and inorganic impurities typically cannot be effected by using a single method or system, which complicates the treatment of water containing both types of impurities.

It is accordingly an object of the present invention to provide a method for the treatment of impurity containing water which overcomes, or at least alleviates, one or more disadvantages of the prior art.

SUMMARY OF THE INVENTION

According to the present invention, there is provided an electrolytic method for treatment of water having organic and/or inorganic impurities therein, the method including:
(a) contacting the water with at least one first electrode device;
(b) providing at least one second electrode device in non-physical, electrical contact with the water; and
(c) passing an electric current between the second electrode device and the first electrode device, so as to establish an electric field in the water of sufficient strength and duration to effect one or both of the following processes:
   (i) localised concentration of the inorganic impurities to facilitate their separation from the water, and
   (ii) electrolytic dissociation of water to produce dissolved oxygen and hydrogen species for treatment of the organic and/or inorganic impurities.

The method may include the use of any of the electrode devices described herein.

The present invention also provides an electrode device for use in the method of the preceding paragraph, the electrode device including:
   a non conductive housing;
   one or more electrodes arranged within the housing;
   an inlet and an outlet in the housing for passage of impurity containing water therethrough such that the water contacts the one or more electrodes; and
   means for connection of the one or more electrodes to a power source.

The present invention further provides a system for use in an electrolytic method for treatment of water having organic and/or inorganic impurities therein, the system including:
(a) at least one first electrode device for contact with the water;
(b) at least one second electrode device for non-physical, electrical contact with the water;
(c) a power source for electrical connection to the first and second electrode devices such as to establish an electric field in the water of sufficient strength and duration to effect one or both of the following processes:
   (i) localised concentrations of the inorganic impurities to facilitate their separation from the water, and
   (ii) electrolytic dissociation of water to produce dissolved oxygen and hydrogen species for treatment of the organic and/or inorganic impurities.

The system may include use of any of the electrode devices disclosed herein.

The present invention further provides a gas diffusing device including:
   a diffuser housing including an inlet and an outlet for passage of a stream of water containing a gas therein; and
   one or more substrates within the diffuser housing, the one or more substrates configured and positioned to provide nucleation sites for formation of microbubbles of the gas.

Such a gas diffusing device may for example be used in conjunction with an electrolytic method or system as described herein.

DETAILED DESCRIPTION OF THE INVENTION

Accordingly, the invention provides a method, system and devices for the electrolytic treatment of water to remove organic and inorganic impurities. The water may arise from any suitable environment, and may be still or moving. For example, the water may be derived from a body of contaminated water contained in a basin, tank, pond, lake, reservoir or a waste water treatment system, or from moving water, such as in a river or a pipeline. The water is typically contained within water containment means.

As used herein the term "water" is intended to include any aqueous or partially aqueous solution. Partially aqueous solutions may include solvents other than water, such as organic and inorganic solvents such as toluene, xylene, methyl ethyl ketone, cyclohexanes, acetones, ethylene glycol, trichloroethylene, turpentine, white spirits, and xylene. The following description will focus on the treatment of waste water such as in a sewage treatment system; however it is to be understood that the invention is not limited to that application.

The method and system both include use of first and second electrode devices. The first electrode device is in direct physical and electrical contact with the water and is typically cathodic. It therefore typically exhibits a negative charge when in use. Preferably, the or each first electrode device includes a non conductive housing and an electrode therein, with the housing providing a conduit for flow of water therethrough such that the water contacts the electrode. In another embodiment, the first electrode device may comprise an electrode mesh or plate immersed in the water.

The second electrode device is in electrical, but not physical, contact with the water and is typically anodic. It therefore typically exhibits a positive charge when in use. The second electrode device may be in contact with the ground and preferably comprises an earth rod remote from the water. In another embodiment, the second electrode device may comprise at least part of a wall of containment means holding the water.

The second electrode device is accordingly not in direct physical contact with the water, although it is in electrical contact. This may be effected by burying the second electrode device in the ground away from the body of water (for example, in the case of treating a large body of water outdoors, eg a lake or a sewage treatment plant) or the electrode may comprise an external wall of a containment means holding the body of water (for example, where a smaller body of water is being treated, eg a tank or pond). In either case, in order for there to be electrical contact between the water and the second electrode device, the water containment means surrounding the body of water (eg walls, surrounding ground etc) should be electrically conductive.

An important feature of the present invention is that by not physically contacting the water with the second electrode device the chemistry of the water can be controlled. Without wishing to be limited by theory, it is believed that while half cell reactions associated with the first electrode device are able to proceed, those associated with the second electrode device are not because relevant aqueous species cannot reach the point of charge of the second electrode device and there is accordingly insufficient ion migration for half cell reactions associated with the second electrode device to proceed to completion in the water. Instead, the second electrode and the region between the second electrode and the inner surface of the containment means becomes a half cell.

Another associated advantage of not having the second electrode device in direct physical contact with the body of water is that galvanic corrosion of electrodes is minimised.

As stated, it is preferred that the first electrode device is cathodic and the second electrode device is anodic.

A cathodic first electrode device is preferred for a number of reasons. Firstly, by virtue of an anodic second electrode device not being in physical contact with the water, there is insufficient ion migration for completion of half cell reactions ordinarily associated with anodes. In particular half cell reactions involving production and outgassing from solution of oxygen as a gaseous phase are typical anodic half cell reactions during electrolysis of water. However, in the preferred embodiment of the method of the present invention, due to the anodic second electrode device being outside the water, anions involved in those half cell reactions are unable to reach the anodic point of charge. There is accordingly insufficient current density within the water for reactions to result in release from solution ("gassing off") of oxygen as a gaseous phase. Accordingly, oxygen is dissolved in solution, resulting in an oxygen enriched solution which may be supersaturated with oxygen. This environment is particularly advantageous in the treatment of organic impurities.

Another reason why a cathodic first electrode device is preferred is because most inorganic contaminants are cationic (especially metal ions) meaning that cations will migrate to the cathode and may undergo half cell reactions and/or precipitation as salts there which can remove them from solution.

Furthermore, the stability of common electrode materials is greater under cathodic, rather than anodic, conditions. Many common electrode metals would be susceptible to oxidation (galvanic corrosion) under anodic conditions, which would further contaminate the water with hydroxides of the anode metal. Accordingly, where the first electrode device is anodic, it is preferably made from oxidation resistant material, such as platinum.

In some embodiments, the polarity of the electrodes may be reversed. For example, where the first electrode device is cathodic, and the second electrode device is anodic, the polarity of the electrodes may be reversed, at least temporarily, for the purpose of periodic cleaning of the electrodes to remove matter deposited thereon during electrolysis, for example metal salts.

When an electrical current is passed through the electrodes, an electric field is set up in the water. The electrical current is typically DC, although an AC current may be used in some applications such as where polarity reversal is required. The electric field should be of sufficient strength and duration to effect one or both of the following processes:
  (i) localised concentrations of the inorganic impurities to facilitate their separation from the water, and
  (ii) electrolytic dissociation of water to produce dissolved oxygen and hydrogen species for treatment of the organic and/or inorganic impurities.

The factors affecting the strength of the electric field include the volume of the water being treated, and the number and size of the electrode devices, particularly of the first electrode devices.

Where the impurities are inorganic, particularly inorganic ions, such as metal ions, the mechanism for their removal will likely include process (i). The localised concentrations of inorganic impurities are caused by the respective migration of ionic impurities in solution to the electrode of opposite charge. Thus, where the first electrode device is cathodic, cationic impurities are attracted thereto where they are reduced and/or may form salts with anionic species in solution. Similarly, anionic impurities are attracted to the inner surface of the water containment means. Accordingly these inorganic impurities are concentrated at the electrode and the inner surface of the water containment means, leaving water in intermediate regions relatively denuded in impurities and able to be captured for use.

The electric field is typically also of sufficient strength and duration to additionally, or instead, cause electrolytic dissociation of water, producing dissolved oxygen and hydrogen in the water, according to process (ii). This mechanism is largely responsible for removal of organic impurities, as well as some inorganic impurities. The overall reaction is:

$$2H_2O(l) \rightarrow 2H_2(g) + O_2(g)$$

Depending on water pH, the half cell reactions are:
Alkaline (eg pH=8)
Cathodic Reaction:

$$2H_2O(l) + 2e^- \rightarrow H_2(g) + 2OH^-(aq)$$

Anodic Reaction:

$$4OH^-(aq) \rightarrow O_2(g) + 2H_2O(l) + 4e^-$$

Acidic (eg pH=6)
Anodic Reaction:

$$2H_2O(l) \rightarrow O_2(g) + 4H^+(aq) + 4e^-$$

Cathodic Reaction:

$$2H^+(aq) + 2e^- \rightarrow H_2(g).$$

However, as noted previously, the half cell reaction for the second electrode device in non physical contact within the water typically does not proceed to completion.

Typically, the second electrode device will be anodic, meaning that there is insufficient current density in the water for the above anodic reactions to produce oxygen in insufficient concentrations to become gaseous. The oxygen is instead dissolved in solution. The dissolved oxygen assists in accelerating respiration and growth of aerobic microorganisms, which leads to faster biological digestion of nutrients comprising of organic and/or inorganic contaminants. Once the contaminants have been digested, the BOD of solution is reduced and the aerobic microorganisms naturally die off.

The process of the invention can advantageously reduce the odour of contaminated water, particularly where the odour is associated with the respiration of anaerobic microorganisms.

Conversely, if the second electrode device is cathodic, the cathodic half cell reactions produce hydrogen in insufficient concentration to be released as a gaseous phase and hydrogen may be supersaturated in solution. Dissolved hydrogen is consumed by hydrogen-oxidising denitrifying bacteria (HOD) in solution which assist to remove nitrates from solution.

The concentrations of other gaseous species in solution, such as $Cl_2$, $N_2$, may be controlled in a similar fashion, depending on whether the relevant half cell reactions producing those gases are able to proceed.

Typically both processes (i) and (ii) will be occurring during the method of the invention, although one may dominate depending on the relative amounts of organic and inorganic impurities present in the water.

The present invention also provides an electrode device which may be used in the electrolytic method and system of the invention. The electrode device is preferably intended for use as the first electrode device in the method of the invention, ie such that it will be in contact with the water being treated. The electrode device includes a non-conductive housing and one or more electrodes arranged within the housing. Preferably the housing includes one or more tubes, preferably made from a plastics material, more preferably made from polyvinylchloride. The housing is preferably non-perforated, and has substantially solid walls, which has the advantage of minimising fouling of the electrode.

Preferably, the one or more electrodes is a rod, which may be solid or hollow, more preferably the rod is made from stainless steel.

More preferably, the one or more electrodes are arranged substantially coaxially within a respective tube.

The electrode device also includes an inlet and an outlet in the housing, for passage of impurity containing water therethrough such that the water contacts the one or more electrodes, and means for connection of the one or more electrodes to a power source.

In a preferred embodiment the one or more electrodes are mounted within a respective tube having an open end which functions as either a water inlet or outlet. The open end of the tube extends beyond the electrode by an amount sufficient to minimise ionic deposits on the electrode. Preferably, the first end of the electrode is adapted for connection to the power source and the open end of the respective tube extends beyond the second free end of the electrode.

The inventor has found that by distancing the free end of the electrode from the open end of the tube, the amount of fouling caused by ionic deposits on the electrode can be reduced, thereby minimising the likelihood of obstruction of water flow past the electrode. The inventor has also found that optimum results are obtained when the open end of the tube is spaced from the electrode by an amount up to 4 times the diameter of the tube, preferably from 0.5 to 4 times the diameter. Without wishing to be limited by theory, it is believed that by distancing the electrode from the open end of the tube, the current path lines within the tube become more focussed, resulting in a relatively concentrated electric field within the tube compared with that outside the tube. Ionic deposits then tend to form on the outside of the tube, rather than on the electrode.

A further advantageous effect of distancing the free electrode end from the open end of the tube is that the focussed electric field reduces power requirement significantly, such as by up to 70-80%. For example, where the tube has a diameter of 100 mm, and the free end of the electrode is spaced approximately 100 mm from the open end of the tube, the current requirements are reduced from approximately 250 mA to 50 mA.

The electrode device preferably further includes means for receiving flow of a reactive fluid, preferably containing an oxidant, through the housing. Preferably the means for receiving a flow of reactive fluid comprises an opening for connection to a supply of a gas. The gas may be any gas that is useful in the context of the invention, but is preferably air or other oxidising gas. The electrode device may be adapted for connection to a supply of compressed air to form an airlift pump.

In one embodiment, the means for receiving a flow of reactive fluid comprises an opening for connection to a supply of aerated water containing microbubbles of air.

The electrode device may further include a gas diffusing means. The gas diffusing means preferably includes one or more substrates positioned so as to be downstream of the supply of oxidising gas when communicating therewith, and upstream of the electrode. The one or more substrates are preferably configured and positioned to provide nucleation sites for formation of fine bubbles (hereinafter called "microbubbles") when contacted with the oxidising gas contained in the water. Accordingly, when the oxidising gas flows past and around the substrates, the microbubbles of oxidising gas form on the nucleation sites.

Preferably the gas diffusing means includes one or more strips depending from the inner surface of the non conductive housing. Each strip includes one or more the substrates for formation of the microbubbles thereon. Each strip is preferably arranged within the housing so as to not impede the flow of water therethrough. Each strip preferably extends substantially in the direction of water flow. More preferably, a plurality of strips depends from the inner surface of the housing. The strips are each preferably mounted at one end thereof, with the free end extending in the downstream direction.

More preferably, the strips are arranged around the circumference of the inner surface of the housing. More preferably, the strips are arranged in at least one helical pattern around the circumference of the inner surface.

The strips can provide a gas diffusing function in a similar manner to a membrane air diffuser. However, unlike a membrane air diffuser, the strips do not suffer the disadvantage of a tendency to cause blockage in water flow due to a film build up on the membrane.

Preferably, the strips are mounted in respective holes provided in the wall of the housing. In this embodiment each strip includes an enlarged end to anchor it in its hole. The housing preferably further includes sealing means between each hole and the enlarged end of its strip to prevent leakage of water therethrough. The housing may include an outer sealing sleeve which sealingly covers each combination of hole and enlarged end.

The present invention also provides a gas diffusing device which may for example be suitable for use with the method and system of the invention. Such a gas diffusing device may be used separately, or in conjunction with the electrode device of the invention. The gas diffusing device includes a diffuser housing having an inlet and an outlet for passage of gas containing water therethrough. Typically the gas will be an oxidising gas such as air or oxygen. The device further includes one or more substrates which provide nucleation sites for formation of microbubbles of the gas, when the water contacts the substrates.

The gas diffusing device, if present, will typically be positioned upstream of the electrode device of the invention and is positioned in the path of water flow in order to increase the number and decrease the size of bubbles of an oxidising gas entering the electrode device.

The diffuser housing will typically be connectable to a supply of oxidising gas. The oxidising gas will preferably enter the diffuser housing close to the water inlet where it mixes within the water and forms bubbles or dissolves in solution. The substrates are preferably provided by one or more strips depending from the inner surface of the diffuser housing. Each strip is preferably arranged within the housing so as to not impede the flow of water therethrough. Each strip preferably extends substantially in the direction of water flow. More preferably, a plurality of strips depends from the inner surface of the housing. The strips are each preferably mounted at one end thereof, with the free end extending in the downstream direction.

More preferably, the strips are arranged around the circumference of the inner surface of the housing. More preferably, the strips are arranged in at least one helical pattern around the circumference of the inner surface.

The strips can provide a gas diffusing function in a similar manner to a membrane air diffuser. However, unlike a membrane air diffuser, the strips do not suffer the disadvantage of a tendency to cause blockage in water flow due to a film build up on the membrane.

Preferably, the strips are mounted in respective holes provided in the wall of the housing. In this embodiment each strip includes an enlarged end to anchor it in its hole. The housing preferably further includes sealing means between each hole and the enlarged end of its strip to prevent leakage of water therethrough. The housing may include an outer sealing sleeve which sealingly covers each combination of hole and enlarged end.

One embodiment of the electrode device includes means for increasing the electrode surface area. This increase in surface area may be achieved by any means known to the skilled artisan such as by the use of a coiled or otherwise convoluted electrode, and/or by the attachment or incorporation of one or more conductive members to the electrode. In a simple embodiment, one or more substantially planar members are attached to a rod electrode. The point of attachment may be any point that is normally submerged, and may be at or on the terminus of the electrode, or at any point along the length of the electrode. The conductive member may be any shape including triangular, rectangular, pentagonal, hexagonal, octagonal, and ovoid. However, the one or more conductive members are typically substantially disc-shaped having a centrally disposed aperture, with the disc being slid onto an electrode rod. Of course, means for electrical conduction between the member and rod electrode is ensured, such that the conductive member becomes part of the electrode per se. In some cases electrical conduction is provided by soldering or welding the conductive member to the rod. In other cases, the fitting of the disc to the rod will be sufficiently tight such that no special means for ensuring conductivity is required. In one embodiment, the electrode device including means for increasing the electrode surface area is disposed in an airlift housing. Without wishing to be limited by theory, electron activity is increased in the airlift which in turn may increase levels of oxygen radicals. The skilled person will understand that the species of radical(s) generated will differ depending on the species of solvent(s) present, and also the species of gas(es) used. The invention is therefore not to be taken as limited to the production of oxygen radicals by an electrolytic reaction between air and water. Furthermore, current lines may be concentrated between the conductive members and the bottom of the airlift housing. Solutes may therefore crystallise as a result of the current lines, leading to the formation of deposits on the electrode. In some cases, these deposits have the appearance of stalactites or stalagmites and act to even further increase the electrode surface area, thereby aiding diffusion and electron availability. The current lines may also cause the spinning of anions, further aiding the distribution and exposure of radicals through the water cluster.

In the context of an airlift housing the skilled person will understand that in order to maintain sufficient processing efficiency, the means for increasing the electrode surface area should not significantly impede flow through the housing. For example, where the conductive member may not extend to the wall of the housing. This may be achieved by the use of a member having a diameter or cross-sectional shape that is smaller than the diameter or cross-sectional shape of the housing such that water may flow around the member. A preferred alternative is to use a substantially circular planar member having a diameter that is the same or similar to the diameter of the housing, wherein the member is folded along one or more lines on the face of the member. An exemplary member in the form of a disc is shown in FIGS. 9b and 9c. In one embodiment where the disc has a diameter (d), the disc is folded along a line about 0.5d from the centre of the disk. The bend may be made at any angle to the plane of the disc, but is preferably at an angle of between 45 and 90 degrees. Typically the bend is made at 90 degrees The bend may made be made in any direction, but is typically in the direction of the proposed water flow.

Figure 9:
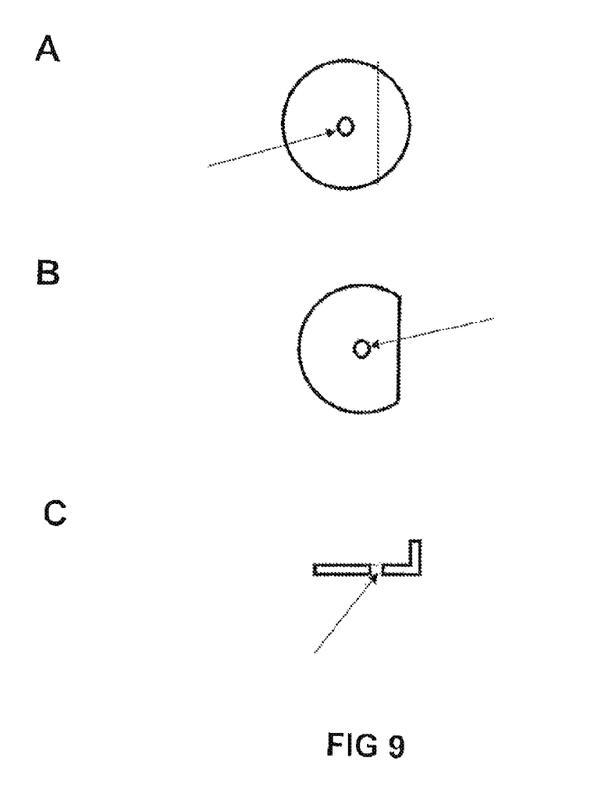
FIG. 9a is a plan view of a disk used to increase the electrode surface area. The line bisecting the disk is a fold line.
FIG. 9b is a plan view of the disk shown at FIG. 9a after folding along the fold line at an angle of 90 degrees.
FIG. 9c shows a cross sectional side view of the disk shown at FIG. 9b. The central aperture of each disk is marked with an arrow

The conductive members may be arranged along an electrode rod in any manner that allows an acceptable flow rate through the airlift housing. For example the members may be staggered, perforated or angled to minimise the impedance of water flow. Where the conductive members are a folded disk as shown in FIG. 9, the disks are arranged along a central electrode rod such that the angled surfaces are substantially opposite the angled surface on a disk above or below (see FIG. 10).

Figure 10:
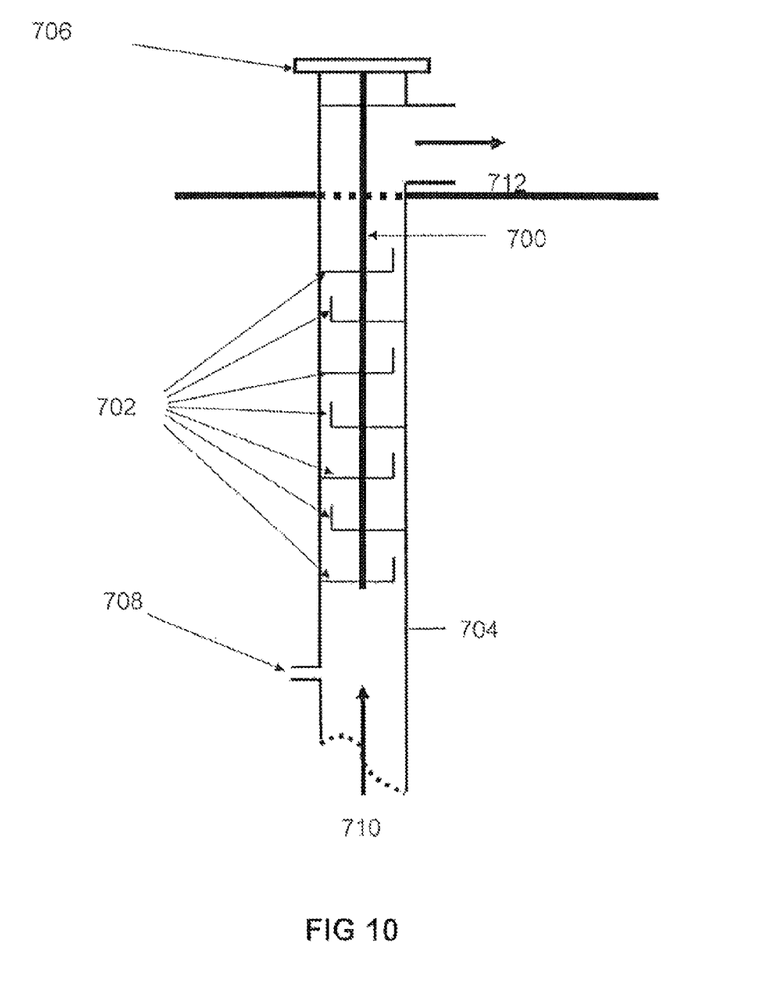
FIG. 10 is a schematic cross section of an electrode having a number of discs of FIGS. 9b and 9c disposed along the length of a central rod electrode. The electrode is incorporated into an airlift housing.

While electrode arrangements as described herein are capable of increasing gas diffusion and/or oxygen redox, a further advantage is that it is possible to determine dissolved oxygen levels by reference to the power levels of the airlift where the electrode is disposed in an airlift housing (see FIG. 10).

The introduction of an oxidant from an external source during the electrolytic method greatly enhances the solubility of the oxidant, such as oxygen in solution, particularly where the first electrode device is cathodic. The introduced oxygen, together with dissolved oxygen produced during electrolysis, can result in a solution supersaturated with oxygen. Production of reactive oxygen species, oxyanions and free radicals is favoured. For example, hydrogen peroxide may be generated by one of the following reactions:

Under alkaline conditions (eg pH=8)

$$2H_2O + 2OH^- + O_2 \rightarrow 3H_2O_2 + 2e^-$$

Under acidic conditions (eg pH=6).

$$O_2 + 2H^+ + 2e^- \rightarrow H_2O_2$$

Hydrogen peroxide and other reactive oxygen species assist in reducing the number of pathogenic micro organisms. In particular, excess oxygen and reactive oxygen species serve to inhibit the proliferation of anaerobic pathogens such as *E. Coli*. While *E. Coli* can survive in aerobic conditions they become a food source when the more aggressive and dominant aerobes are present.

The electrode device of the invention is particularly useful in the treatment of waste water, particularly in the presence of an introduced oxidant. More particularly, the electrode device is applicable for use as the first electrode device in the method of the invention when used in a reticulated waste water treatment system such as a sewage treatment system. The reticulated waste water treatment system is preferably one including a number of chambers, for staged purification of water. Such chambers typically include a primary or anaerobic chamber, a secondary or aerobic chamber and a tertiary or clarification chamber. The electrode device of the invention can be provided in at least one of those chambers, and preferably in all except the primary (anaerobic) chambers. The electrode device is preferably used in conjunction with an introduced oxidant, preferably oxygen. The oxygen is conveniently introduced by aerating the waste water, although it may be introduced as oxygen gas. Alternatively, other oxidants, preferably oxidising gases, such as NO, ozone, or ionised versions of these, may instead be introduced. As mentioned elsewhere herein, the electrode device may be configured such that in use it is capable of acting as both an electrode and a gas diffuser. It has been found that the use of a device having both capabilities leads to an increase in gas diffusion or oxygen redox levels. The increase in oxygen redox levels may be the result of, or may manifest in an increase in the levels of oxygen radical(s) in the solution under treatment. In some cases, use of a device having both electrode and diffuser capabilities leads to increases in gas diffusion and oxygen redox levels. Additionally or alternatively to the foregoing advantages, use of the device is further capable of increasing gas diffusion and/or oxygen redox levels while having no effect, or a minor effect, on flow rate.

Alternatively, the oxidant is introduced into the electrode device in the form of oxidant containing water, preferably water containing microbubbles of air, such as derived from a gas diffuser as previously described.

The transfer of water from one chamber to the next in the reticulated waste water system is preferably effected by a gas pump, more preferably an air pump configured as an airlift pump. In this manner, the air pump can provide a simple, low cost source of oxidant in addition to a means of moving water between chambers. Preferably each electrode device includes an opening for receiving a flow of air from the air pump. The electrode devices are preferably connected in fluid communication with each other such that the water flows from the outlet of one tube into the inlet of an adjacent tube.

Accordingly, the present invention enables one or more of the following important advantages to be achieved:

1. Efficient localised concentrations of inorganic impurities, especially ionic impurities.
2. Increased solubility of gaseous phases, especially of oxygen, which assists in the growth of desirable microorganisms for nutrient digestion.
3. Reduced corrosion of the second electrode by virtue of it not being in contact with water.
4. The ability to treat both organic and inorganic impurities in a single process and system.
5 The inventors have also found that substantially increased levels of oxygenation are achieved by aeration in conjunction with use of the electrode device of the invention compared with aeration alone.

BRIEF DESCRIPTION OF DRAWINGS

The invention will now be described in greater detail with reference to the accompanying drawings, in which.

DETAILED DESCRIPTION OF PREFERRED EMBODIMENTS

Figure 1:
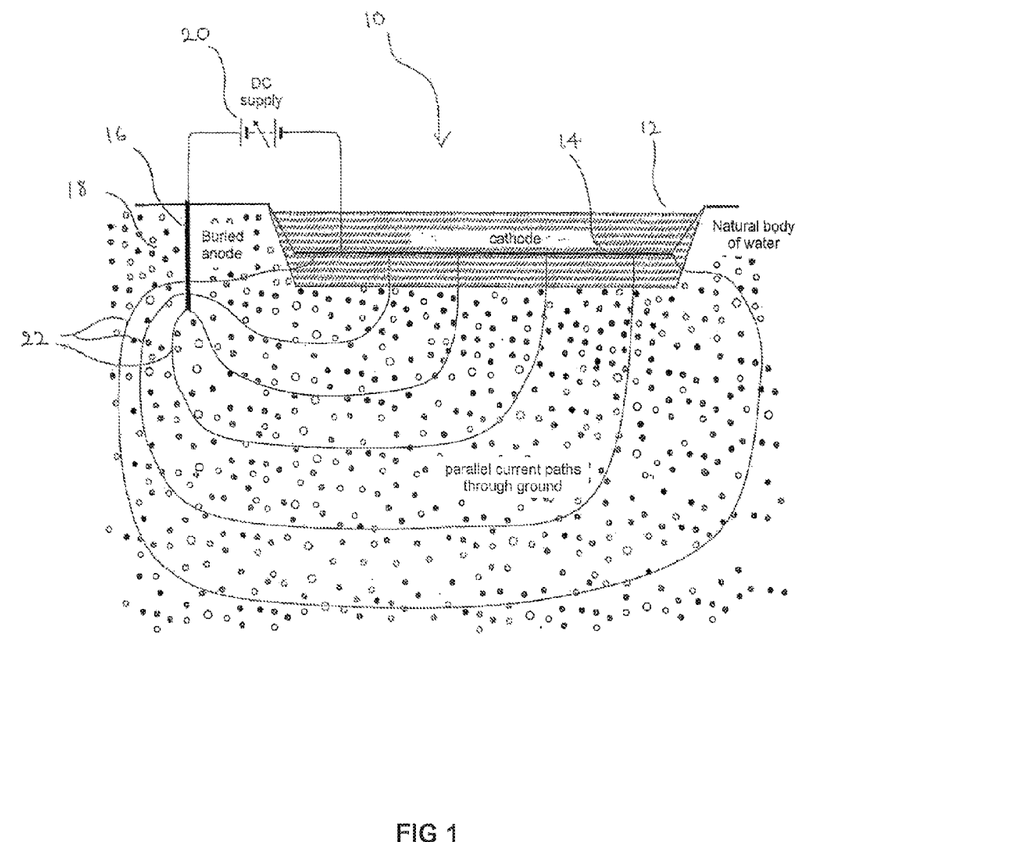
FIG. 1 is a schematic cross section showing a first embodiment of the method and system of the invention.

In the following discussion of the drawings, like reference numerals refer to like parts. FIG. 1 shows a schematic cross section 10 of a first embodiment of the method and system of the invention, as used to treat impurities in a natural body of water 12, such as a lake, pond or a reservoir. A first electrode device including a substantially planar cathode (eg a mesh or a plate) 14 is immersed in and covers an area within the body of water 12. A second electrode device including an anode rod 16, is buried in the ground 18 surrounding the body of water 12 The ground 18 effectively acts as a water containment means for the body of water 12. The substantially planar cathode 14 and anode rod 16 are connected to the negative and positive terminals respectively, of a power source including a DC voltage supply 20. The DC voltage supply 20 is adjustable to provide a voltage of between 0 and −100 volts, thereby establishing an electric field in the body of water 12 and surrounding ground 18, shown by current path lines 22. The voltage is adjusted until an electric field of sufficient strength and duration is achieved to effect one or both of the following processes:
  (i) localised concentrations of the inorganic impurities to facilitate their separation from the water, and
  (ii) electrolytic dissociation of water to produce dissolved oxygen and hydrogen species for treatment of the organic and/or inorganic impurities.

Figure 2:
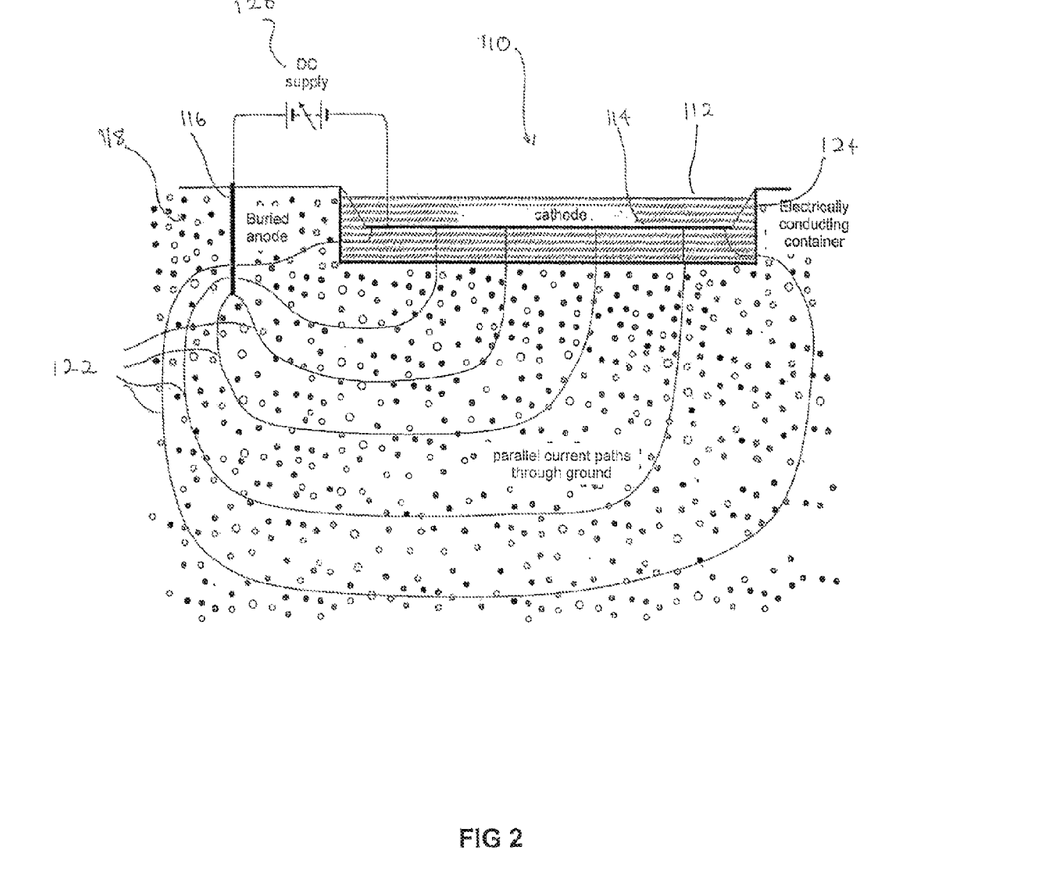
FIG. 2 is a schematic cross section showing a second embodiment of the method and system of the invention.
Figure 3:
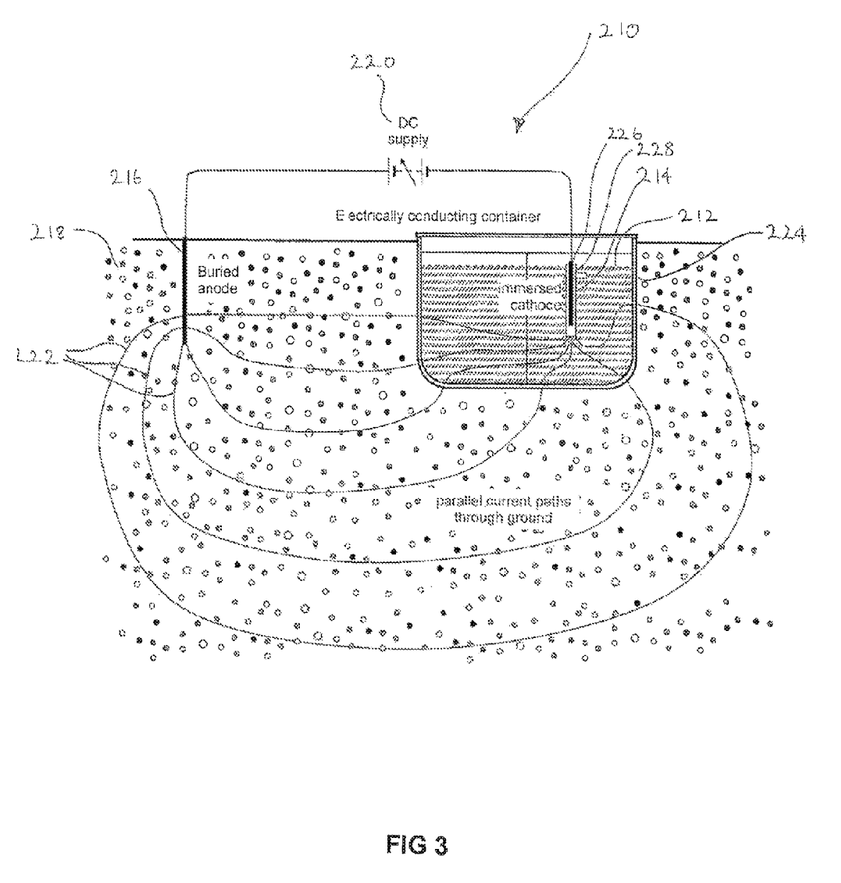
FIG. 3 is a schematic cross section showing a third embodiment of the method and system of the invention
Figure 4:
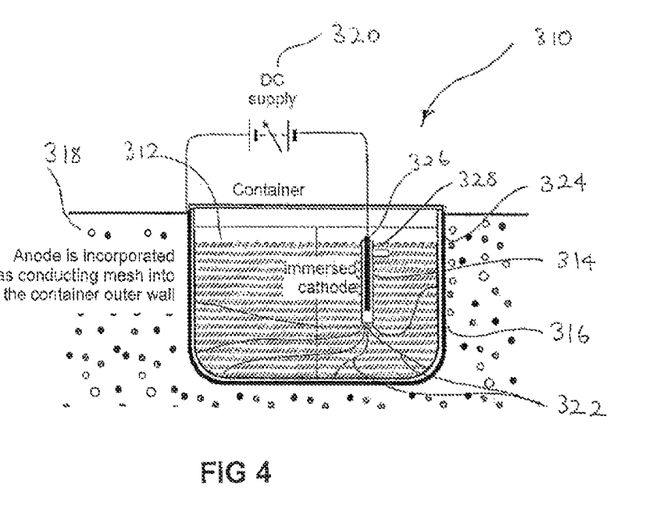
FIG. 4 is a schematic cross section showing a fourth embodiment of the method and system of the invention.

In the following description of FIGS. 2, 3 and 4 illustrating the second, third and fourth embodiments respectively of the method and system of the invention, discussion will focus on those aspects of the embodiments which differ from those of the first embodiment.

In FIG. 2, the body of water 112 is provided within a water containment means including an electrically conductive container 124. Accordingly, the current path lines 122 pass from the power supply 120, through the buried anode 116 through the ground 118, through the wall of the electrically conductive container 124, into the body of water 112, then to the immersed substantially planar cathode 114 and back to the power supply 120.

FIG. 3 shows a variation in which the first electrode device is an immersed cathodic device 214 including a cathode 226 within a non conductive housing 228. A more detailed description of the cathode device 214 is provided in the discussion of FIG. 5 below.

FIG. 4 shows a further variation in which the second electrode device comprises an anode 316 provided in the outer wall of the conducting container 324. The anode 316 comprises a conducting mesh incorporated into the outer wall of the container 324. The outer wall is not in physical contact with the water. Accordingly, the electric field, indicated by current path lines 322, is wholly within the conducting container 324 and the body of water 312 and does not extend out to the surrounding ground 318.

Figure 5:
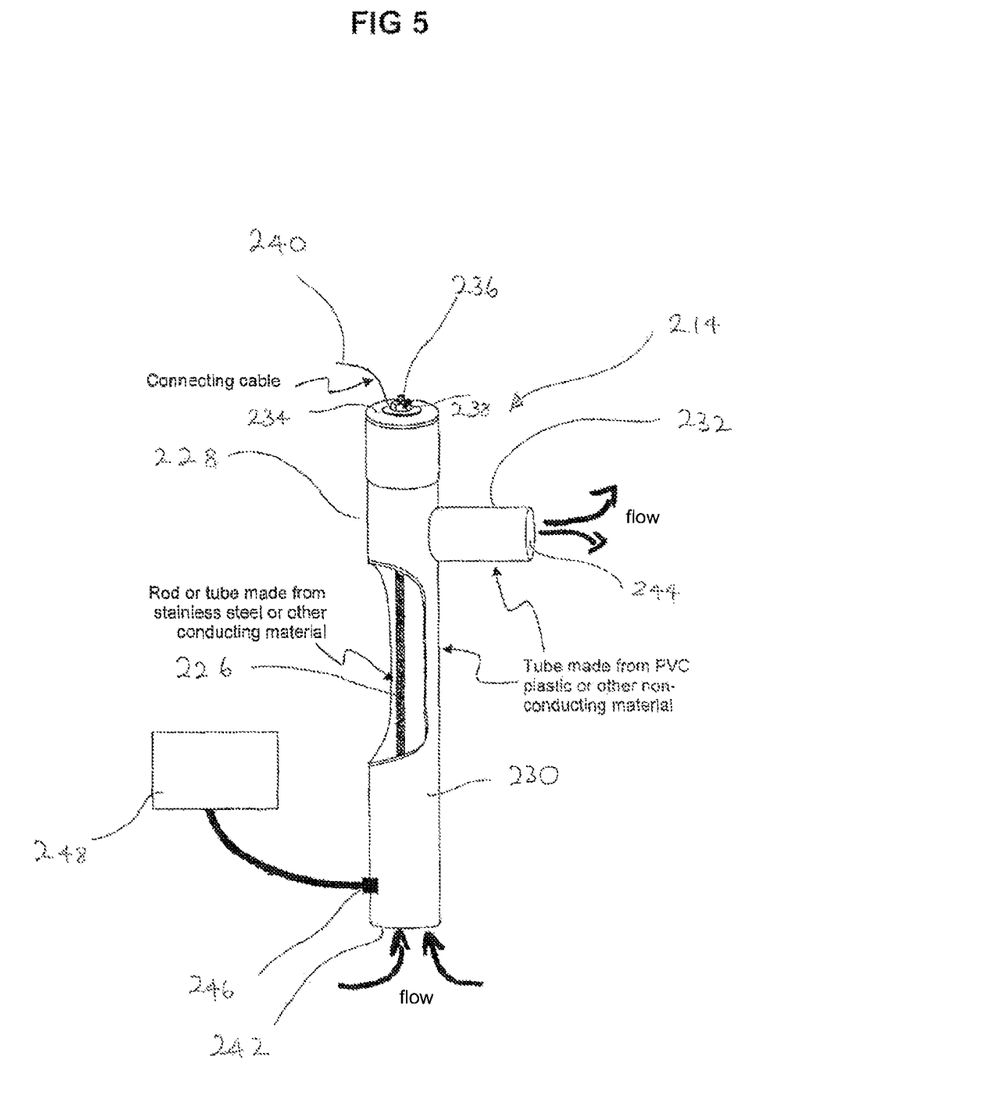
FIG. 5 is a perspective, partially cut away view of a first preferred embodiment of the first electrode device of the invention.

FIG. 5 shows in greater detail the electrode device 214 described in relation to FIG. 3. The electrode device 214 includes a non conductive housing 228 containing a stainless steel rod electrode 226 therein. This non conductive housing 228 is constructed from polyvinylchloride and includes a main body including a PVC tube 230, (shown partially cut away in FIG. 5) with an exit conduit 232, also made from PVC, extending laterally therefrom.

At the upper end of the PVC tube 230 is provided a mounting cap 234 through which an end 236 of the electrode 226 extends and is mounted thereto by means of a nut 238. The electrode end 236 and nut 238 together form a terminal to which an electric cable 240 may be attached for connection with the power supply 220.

At the open lower end of the PVC tube 230 is provided an inlet 242 through which impurity containing water from the body of water 212 enters the electrode device 214.

An outlet 244 is provided at the end of the exit conduit 232 through which water leaves the electrode device after treatment.

The electrode device further includes means for receiving a flow of oxidant including an opening 246 for connection to a compressed air pump, shown schematically at 248. The air pump 248 is configured to operate as an airlift pump and assists the movement of contaminated water from the inlet 242, through the PVC tube 230 where it contacts the electrode 226, and out the exit conduit 232. In addition, the introduction of oxygen by the air pump 248 adds to the level of dissolved oxygen produced by the electrolysis process and may lead to supersaturation of oxygen in solution. Such a chemical environment accelerates respiration and growth of microorganisms and enhances digestion of nutrients including organic and/or inorganic impurities.

The electrolysis process also results in migration of ions to the electrode (in this case, cations when the electrode is connected to the negative terminal of the power supply means) where they are oxidised or reduced and/or form crystal lattices with anions in solution.

Figure 6:
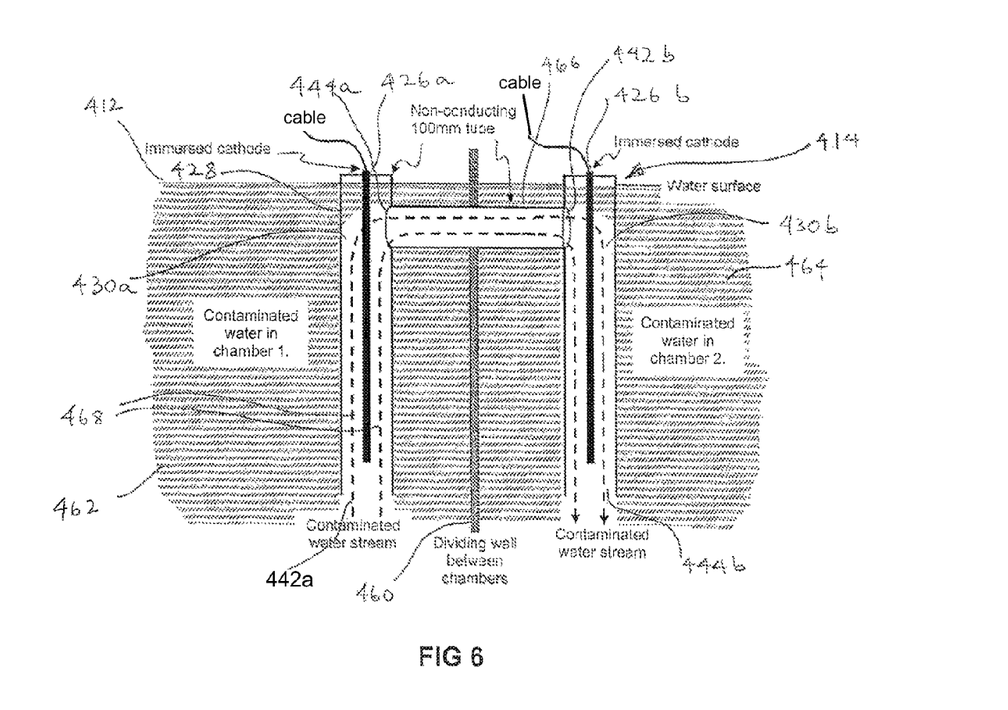
FIG. 6 is a schematic cross section showing a second preferred embodiment of the first electrode device of the invention.
Figure 7:
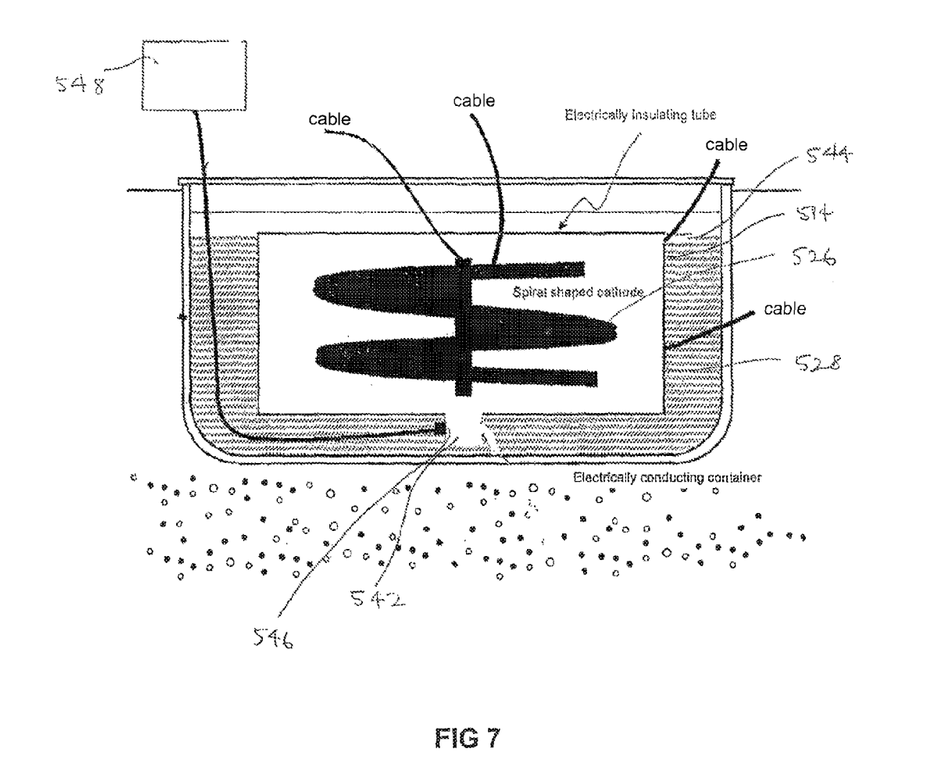
FIG. 7 is a schematic cross section showing a third embodiment of the first electrode device of the invention.

In the following description of FIGS. 6, 7 and 8 illustrating the second, third and fourth embodiments respectively, of the electrode device of the invention, discussion will focus on those aspects of the embodiments which differ from those of the first embodiment of the electrode device.

FIG. 6 shows another embodiment of the electrode device 414 which extends across a dividing wall 460 between two chambers 462, 464 within the body of water 412.

The electrode device 414 comprises a housing 428 in which are provided respective first electrodes 426a, b, which are substantially coaxially mounted in first and second PVC tubes 430a, b, respectively. The PVC tubes 430a, b are joined together close to their upper, proximal ends by a bridging component 466, also including a PVC tube, which passes through the dividing wall 460.

A contaminated water stream passes into the electrode device 414 via first inlet 442a located at the lower, distal end of the first PVC tube 430a. The water stream follows the path indicated by the dotted lines 468, moving around and past the first electrode 426a, through the first outlet 444a and into the bridging component 466. The stream then enters the second inlet 442b located at the upper, proximal end of the second PVC tube 430b, flows around and past the second electrode 426b, and exits through the second outlet 444b located at the lower, distal end of the second PVC tube 430b.

The arrangement shown in FIG. 6 facilitates recirculation of water as it is being treated, thereby maximising exposure of impurities to dissolved oxygen and thereby increasing the efficiency of purification.

Turning now to FIG. 7, an electrode device 514 is shown, having a helical or spiral electrode 526 provided within a non conductive housing 528. The non conductive housing 528 includes an inlet 542 located at the lower end of the housing 528, and an outlet 544 located at the upper end thereof. An opening 546 is provided adjacent the inlet 542 for connection to a supply of compressed air, indicated generally at 548. The helical electrode 526 has a relatively high surface area for contact with the contaminated water, thereby maximising exposure of contaminated water to the influence of the electrode.

Figure 8A:
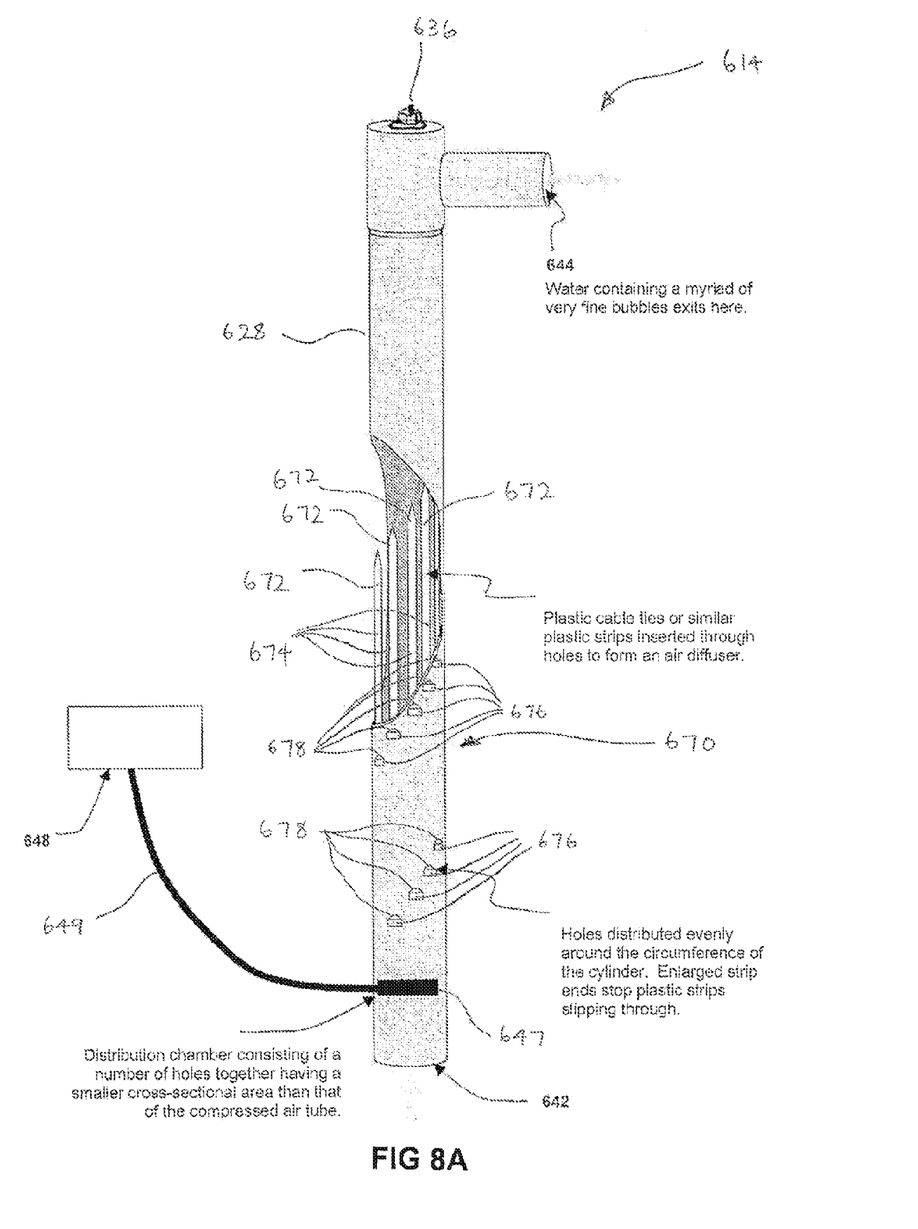
FIGS. 8a and 8b are perspective partially cut away views of fourth preferred embodiment of the first electrode device of the invention.
Figure 8B:
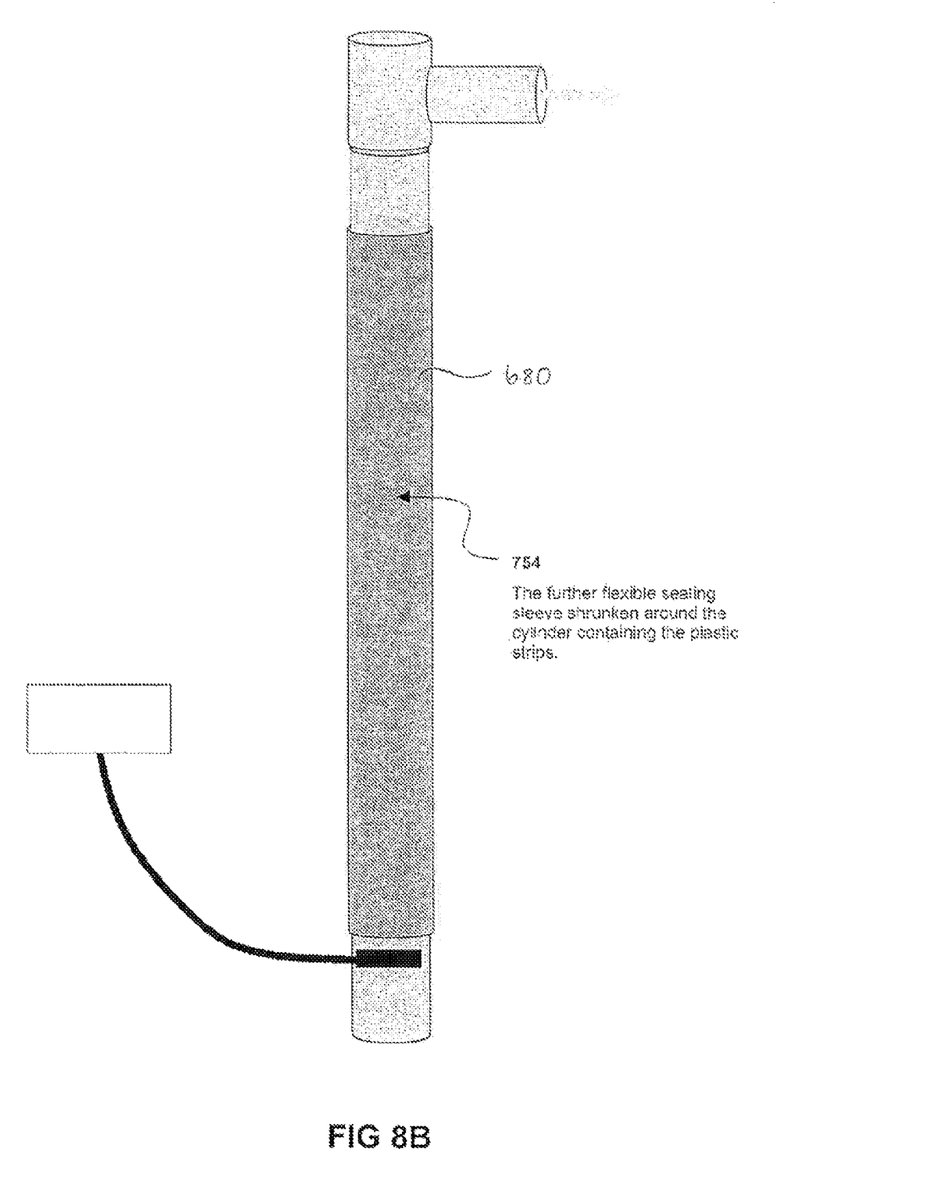

FIGS. 8a and 8b show a fourth embodiment of an electrode device of the invention. An electrode device 614 is shown including a non conductive housing 628 and an electrode, only the upper end 636 of which is visible. The non conductive housing 628 includes an inlet 642 located at the lower end of the housing 628 and an outlet 644 located at the upper end thereof.

A supply of compressed air 648 is connected via a compressed air tube 649 to the non conductive housing at an opening 646 including a distribution chamber 647 which consists of a number of holes (not shown) having a combined cross-sectional area smaller than that of the compressed air tube 649.

The electrode device 614 also includes gas diffusing means indicated generally at 670. The gas diffusing means includes a number of substrates 672 for formation of microbubbles thereon. The substrates 672 comprise the surfaces of a plurality of plastic strips 674 extending substantially axially inside the non conductive housing. Each plastic strip 674 is anchored by one, enlarged end 676 thereof in a respective hole 678 provided in the wall of the non-conductive housing 628. The holes 678 are arranged in a substantially helical pattern around the non-conductive housing 628. The strips 674 are arranged so as to extend in a substantially downstream direction from the anchored enlarged ends 676.

FIG. 8b shows the electrode device 614 including a sealing sleeve 680 provided on the outer surface of the non-conductive housing 628 in order to seal between each hole 678 and the enlarged end 676 of the plastic strip 674 accommodated therein. The sealing sleeve 680 is shrunk fitted onto the non-conductive housing 628 to ensure a water tight seal.

In use of the fourth embodiment 614, air is introduced via the distribution chamber 647 as a stream of bubbles into the contaminated water flowing from the inlet 642. The consequent reduction in density of water inside the non-conductive housing 628 causes the aerated water to rise and draw further water into the inlet 642. As the aerated water rises, it passes through the gas diffusing means 670, where the air bubbles interact with nucleation sites on the substrates to form microbubbles. The water containing microbubbles exhibits a far higher level of dissolved oxygen than water which has simply been aerated. The level of dissolved oxygen can be enhanced even further by the electrolytic production of oxygen at the electrode extending below the electrode end 636.

FIGS. 9a, 9b and 9c show a conductive member (disk of diameter 103 mm) that may be fitted to any of the electrodes described herein in order to increase surface area. In this embodiment, the fold line is 26.5 mm from the centre of the disk. The arrows show the position of the central mounting aperture of each disk.

FIG. 10 shows a rod electrode 700, fitted with a number of conductive members 702 (as shown in FIGS. 9b and 9c). The electrode is disposed in an airlift housing 704 having a sealed lid 706, an air line input 708, water intake 710, water/air outflow 712. Water enters at the water intake 710, and is diffused with air introduced by the input line 708. The water and air mixture moves in an upward direction and over the electrode 700 and conductive members 702. The conductive members are arranged so that the folded area of the conductive members are opposite members above and below on the rod electrode. While it will be apparent that the water and air must take a more convoluted path up and through the housing, the conductive members are designed and disposed such that the flow rate is not substantially impeded.

The present invention will now be further described by reference to the following non-limiting examples.

EXAMPLES

Example 1

Treatment of reticulated waste water

Two reticulated waste water systems were treated in accordance with the electrolytic treatment method of the invention. Each system contained an electrode device between adjacent chambers, as illustrated in FIG. 6.

In system 1, the waste water was additionally treated by introducing air via an airlift pump throughout the test. The waste water in system 2 was initially aerated, then aeration was discontinued.

The water in each system was analysed on two dates approximately 5 months apart. The water was analysed for the following qualities, using the indicated APHA Standard Methods for the Examination of Water and Wastewater (20$^{th}$ Ed) 1998.

| Biochemical Oxygen Demand | APHA 5210B |
|---|---|
| Total Suspended Solids | APHA 2540D |
| Dissolved Oxygen | APHA 4500-OC |

The results of the analyses are as follows:

| | | System ID | | | |
|---|---|---|---|---|---|
| | | 1 | | 2 | |
| | | Sample Date | | | |
| Tests: | Units: | 25, Jun. 2007 | 19, Nov. 2007 | 25, Jun. 2007 | 19, Nov. 2007 |
| Biochemical Oxygen Demand | mg/L | 3.4 | <1 | 1.5 | 9.7 |
| Total Suspended Solids | mg/L | 3 | 2 | 9 | 11 |
| Dissolved Oxygen | mg/L | 10.9 | 10.4 | 7.9 | 9.0 |

The dissolved oxygen levels are of particular interest given that water solubility of oxygen at 25° C. and pressure of 1 atm. is 40 mg/L. In air with a normal composition the oxygen partial pressure is 0.2 atm. This results in a solubility maximum of 40×0.2=8 mg/L by an aeration means alone. (At 20° C. at sea-level the maximum attainable dissolved oxygen by mechanical aeration is 9.18 mg/L.)

These results show sustained dissolved oxygen levels near or above this maximum in both systems.

For system 1 which included continuous aeration throughout the test, it can be seen that the water additionally exhibited reduced BOD and reduced TSS values at the later measurement date.

Example 2

Treatment of Reticulated Waste Water (2)

A reticulated waste water system was treated in accordance with the method of the invention. Each of the aerobic chambers showed 3 to 5 ppm hydrogen peroxide after 2 months of continuous aeration using a 60 watt compressor in an air-lift pump circulating arrangement.

Finally, it is to be understood that various other modifications and/or alterations may be made without departing from the spirit of the present invention as outlined herein.

The invention claimed is:
1. A method of treating a body of contaminated water to increase dissolved oxygen content and remove cationic impurities, the method comprising the steps of:

(a) contacting the water with at least one cathode device having a cathode disposed inside a nonconductive housing that provides a conduit for the flow of water therethrough from an inlet to an outlet in the housing such that the water contacts and flows past the cathode;

(b) providing at least one anode in electrical contact with the body of water but located outside the body of water in soil or a containment wall proximal to the body of water;

(c) pumping air bubbles into the water in or near the inlet of the housing so that the water flowing past the cathode contains the air bubbles; and (d) passing an electrical current between the cathode and the anode so as to establish an electrical field at the cathode of sufficient strength and duration to effect an electrolytic dissociation of water to produce dissolved hydrogen species at the cathode and thereby to facilitate removal of the cationic impurities.

2. The method of claim 1, wherein the body of water includes a plurality of chambers in the fluid communication with each other which are part of a reticulated water treatment system, and wherein the outlet of the cathode housing feeds water from one chamber into an adjacent chamber and the step of pumping air bubbles also serves as an air lift pump to move the water from the one chamber into the adjacent chamber.

3. The method of claim 1, wherein the housing of the cathode is in the shape of a tube disposed in the water with the inlet at a lower end of the tube, and the step of pumping air bubbles also serves as an air lift to flow the water through the housing.

4. The method of claim 3, wherein the inlet of the housing is an open end of the tube and the open end of the tube extends beyond an end of the cathode by a distance of at least one half of a diameter of the tube, whereby power consumption is substantially reduced.

5. The method of claim 4, wherein the open end of the tube extends beyond the end of the cathode by a distance of less than four times the diameter of the tube.

6. The method of claim 1, wherein the cathode device comprises a gas diffuser arranged upstream of the cathode comprising one or more substrates configured and positioned to provide nucleation sites for formation of microbubbles of the air.

7. The method of claim 1, wherein the electrical current is less than 250 mA at a voltage of less than 100 V.

8. A system for treating a body of contaminated water to increase dissolved oxygen content and remove cationic impurities, the system comprising:

(a) at least one cathode device in contact with the water having a cathode disposed inside a nonconductive housing that provides a conduit for the flow of water therethrough from an inlet to an outlet in the housing such that the water contacts and flows past the cathode;

(b) at least one anode in electrical contact with the body of water but located outside the body of water in soil or a containment wall proximal to the body of water;

(c) an air pump to pump air bubbles into the water in or near the inlet of the housing so that the water flowing past the cathode contains the air bubbles; and (d) a power source connected between the cathode and the anode adapted to pass an electrical current between the cathode and the anode so as to establish an electrical field at the cathode of sufficient strength and duration to effect an electrolytic dissociation of water to produce dissolved hydrogen species at the cathode and thereby to facilitate removal of the cationic impurities.

9. The system of claim 8, wherein the body of water includes a plurality of chambers in the fluid communication with each other which are part of a reticulated water treatment system, and wherein the outlet of the cathode housing feeds water from one chamber into an adjacent chamber and the air pump also serves as an air lift to move the water from the one chamber into the adjacent chamber.

10. The system of claim 8, wherein the housing of the cathode is in the shape of a tube disposed in the water with the inlet at a lower end of the tube, and the air pump also serves as an air lift to flow the water through the housing.

11. The system of claim 10, wherein the inlet of the housing is an open end of the tube and the open end of the tube extends beyond an end of the cathode by a distance of at least one half of a diameter of the tube, whereby power consumption is substantially reduced.

12. The system of claim 11, wherein the open end of the tube extends beyond the end of the cathode by a distance of less than four times the diameter of the tube.

13. The system of claim 8, wherein the cathode device comprises a gas diffuser arranged upstream of the cathode comprising one or more substrates configured and positioned to provide nucleation sites for formation of microbubbles of the air.

14. The system of claim 8, wherein the electrical current is less than 250 mA at a voltage of less than 100 V.

15. A method of treating a body of contaminated water to increase dissolved oxygen content and remove cationic impurities, the method comprising the steps of:

(a) providing a cathode device in physical and electrical contact with the body of water, wherein the cathode device is disposed in the body of water, wherein the cathode device comprises a cathode disposed inside a tubular nonconductive housing that provides a conduit for the flow of water therethrough from an inlet to an outlet in the housing such that the water contacts and flows past the cathode;

(b) providing an anode in electrical contact but not physical contact with the body of water, wherein the anode is not located within the body of water but is located in soil or a containment wall proximal to the body of water;

(c) pumping air bubbles into the body of water via an outside air pump, wherein the outside air pump pumps outside air from outside the body of water into the body of water thereby introducing air bubbles into the water at or near the inlet of the housing so that the water flowing past the cathode contains the air bubbles; and (d) passing an electrical current between the cathode and the anode via a power source connected between the cathode and the anode so as to establish an electrical field at the cathode of sufficient strength and duration to effect an electrolytic dissociation of water to produce dissolved hydrogen species at the cathode and thereby to facilitate removal of the cationic impurities.

* * * * *